United States Patent
Sun et al.

(10) Patent No.: US 9,933,608 B2
(45) Date of Patent: Apr. 3, 2018

(54) MINIATURE MICROSCOPE AND MANUFACTURING METHOD OF OPTICAL ELEMENT THEREOF

(71) Applicant: National Chiao Tung University, Hsinchu (TW)

(72) Inventors: Ching-Cherng Sun, Yangmei (TW); Yeh-Wei Yu, Pingzhen (TW); Chih-Yuan Cheng, Tainan (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 1375 days.

(21) Appl. No.: 13/872,831

(22) Filed: Apr. 29, 2013

(65) Prior Publication Data

US 2013/0293697 A1 Nov. 7, 2013

(30) Foreign Application Priority Data

May 4, 2012 (TW) .............................. 101116029 A

(51) Int. Cl.
*G02B 5/32* (2006.01)
*G02B 21/36* (2006.01)
(Continued)

(52) U.S. Cl.
CPC ............. *G02B 21/361* (2013.01); *G03H 1/04* (2013.01); *G03H 1/041* (2013.01); *G03H 1/0408* (2013.01); *G03H 1/0443* (2013.01); *G03H 2001/005* (2013.01); *G03H 2001/0419* (2013.01); *G03H 2001/0439* (2013.01); *G03H 2001/0445* (2013.01); *G03H 2001/0447* (2013.01); *G03H 2001/0469* (2013.01); *G03H 2001/0471* (2013.01); *G03H 2222/52* (2013.01); *G03H 2222/53* (2013.01); *G03H 2223/16* (2013.01)

(58) Field of Classification Search
CPC ........ G02B 5/32; G02B 21/00; G02B 21/004; G02B 21/36; G02B 21/361; G03H 1/00; G03H 1/0005; G03H 2001/005
USPC .... 359/1, 3, 15, 16, 19, 22, 30, 32, 35, 362, 359/368, 370, 385, 388, 389, 390
See application file for complete search history.

(56) References Cited

U.S. PATENT DOCUMENTS 5,235,441 A * 8/1993 Georgaras ............... A61F 9/022
351/159.01
6,330,086 B1 12/2001 Collot et al.
(Continued)

FOREIGN PATENT DOCUMENTS

JP 2005-010585 1/2005

OTHER PUBLICATIONS

Myungjun Lee et al., "Field-portable reflection and transmission microscopy based on lensless holography", Biomedical Optics Express 2, Aug. 30, 2011, pp. 2721-2730.
(Continued)

*Primary Examiner* — Arnel C Lavarias
(74) *Attorney, Agent, or Firm* — Muncy, Geissler, Olds & Lowe, P.C.

(57) ABSTRACT

A manufacturing method of an optical element applied to a miniature microscope includes the steps of: emitting a signal light and a reference light to an optical material; and forming a plurality of gratings on the optical material by interfering the signal light and the reference light. A miniature microscope is also disclosed.

18 Claims, 13 Drawing Sheets

(51) Int. Cl.
G03H 1/04 (2006.01)
G03H 1/00 (2006.01)

(56) References Cited

U.S. PATENT DOCUMENTS

| | | |
|---|---|---|
| 6,809,845 B1 | 10/2004 | Kim et al. |
| 7,088,480 B1 | 8/2006 | Javidi et al. |
| 7,221,760 B2 | 5/2007 | Javidi et al. |
| 7,812,959 B1* | 10/2010 | Kim ................ G01B 9/021 356/458 |
| 7,929,109 B2 | 4/2011 | Poon et al. |
| 8,699,033 B2* | 4/2014 | Dubois ............. G02B 21/10 356/457 |
| 2004/0021920 A1* | 2/2004 | Psaltis ................ G01J 3/28 359/15 |
| 2006/0132799 A1 | 6/2006 | Dubois et al. |
| 2006/0140101 A1 | 6/2006 | Tsukagoshi et al. |
| 2010/0253986 A1 | 10/2010 | Awatsuji et al. |
| 2013/0148182 A1* | 6/2013 | Yu ................ G03H 1/0443 359/22 |

OTHER PUBLICATIONS

Hao, "Miniature Digital Holographic Microscope", Jul. 24, 2012, 58 pages, Department of Optics and Photonics, National Central University, Chung-Li, Taiwan.

\* cited by examiner

MINIATURE MICROSCOPE AND MANUFACTURING METHOD OF OPTICAL ELEMENT THEREOF

CROSS REFERENCE TO RELATED APPLICATIONS

This Non-provisional application claims priority under 35 U.S.C. § 119(a) on Patent Application No(s). 101116029 filed in Republic of China on May 4, 2012, the entire contents of which are hereby incorporated by reference.

BACKGROUND OF THE INVENTION

Field of Invention

The invention relates to a microscope and a manufacturing method of an optical element thereof and, in particular, to a miniature microscope and a manufacturing method of an optical element thereof.

Related Art

In the present technologies, most images are captured and stored for preservation in two-dimensional pictures or videos, so sometimes, three-dimensional images need to be converted to two-dimensional images. However, when the three-dimensional images are converted to the two-dimensional images, the image distortion problem will occur. Hence, in order to make the preserved images look more like the three-dimensional images that humans actually see, the three-dimensional holography technology is developed.

FIG. 1 is a schematic diagram of a conventional digital holographic apparatus 1, which includes a beam splitter 11 and an image-capturing element 12. The steps of capturing images of an object O used by the digital holographic apparatus 1 are illustrated as below. At first, the object O is illuminated with a light source to generate a signal light L1 that is emitted into a side of the beam splitter 11. In the meantime, a reference light L2 is emitted into another side of the beam splitter 11 so that interference fringes are formed by the signal light L1 and the reference light L2 and then emitted from the beam splitter 11. Afterwards, the image-capturing element 12 can capture the interference fringes to rebuild the phase and strength distribution.

However, the beam splitter 11 of the conventional digital holographic apparatus 1 has a certain width, such that the interval of the object O and the image-capturing element 12 can not be reduced further. Accordingly, the high-frequency diffracted light emitted from the beam splitter 11 can not be captured because the image-capturing element 12 is restricted to a finite size. In other words, because the image-capturing element 12 can not capture the high-frequency portion of the signal light L1, the reconstructed image of the object O will be stuck with the image distortion problem.

SUMMARY OF THE INVENTION

In view of the foregoing subject, an objective of the invention is to provide a manufacturing method of an optical element that can reduce the distance between an image-capturing element and an object, and a miniature microscope that uses the said optical element to accurately reconstruct the object's image.

To achieve the above objective, a manufacturing method of an optical element applied to a miniature microscope of the invention comprises the steps of: emitting a signal light and a reference light to an optical material; and forming a plurality of gratings on the optical material by interfering the signal light and the reference light.

In one embodiment, the manufacturing method further comprises exposing and developing the optical material.

In one embodiment, each of the signal light and the reference light is a plane wave or a spherical wave. The reference light and the signal light have an included angle. The optical material has a lead angle.

In one embodiment, the reference light is emitted to the optical material through a light-guiding element.

In one embodiment, the manufacturing method further comprises moving a mask to adjust the light intensity of the signal light emitted to the optical material.

In one embodiment, the manufacturing method further comprises adjusting the light intensity of the signal light emitted to the optical material by using a gradually changeable light-decreasing plate.

In one embodiment, the signal light is divided into a front signal light and a rear signal light.

To achieve the above objective, a miniature microscope of the invention comprises a first optical element, an image-capturing element, a calculating and a display element. An object. light and a reference light. are emitted through the first optical element to form a light field interference distribution. The image-capturing element receives the light field interference distribution to generate an image signal. The calculating element receives the image signal and calculates according to the image signal to produce a display signal. The display element receives the display signal to display an object's image.

In one embodiment, the first optical element is made by the manufacturing method as mentioned above.

In one embodiment, the material of the first optical element includes glass or a high polymer. The first optical element includes a microstructure through which the reference light passes. The miniature microscope further includes an optical element. The reference light is emitted to the first optical element after emitted through the optical element.

In one embodiment, the miniature microscope further includes a light source generating a coherent light emitted to an object to form the object light. The light source also generates the reference light. The miniature microscope further includes a second optical element and a light-guiding element. The object is disposed between the first and second optical elements, and the coherent light is emitted through the light-guiding element.

In one embodiment, the miniature microscope further includes a reflecting element on which the object is disposed.

As mentioned above, in the manufacturing method of the optical element of the invention, an optical material is used to form the thinner optical element, so that the distance between the object and the image-capturing element can be reduced. Hence, the image-capturing element can receive the high-frequency portion of the signal light so as to enhance the definition of the reconstructed object's images. Furthermore, because the definition of the reconstructed object's images is enhanced, the clearer images can be obtained. Besides, by the thinner optical element, the apparatus's size can be reduced. Accordingly, the optical element of the invention can be used to manufacture a miniature microscope.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
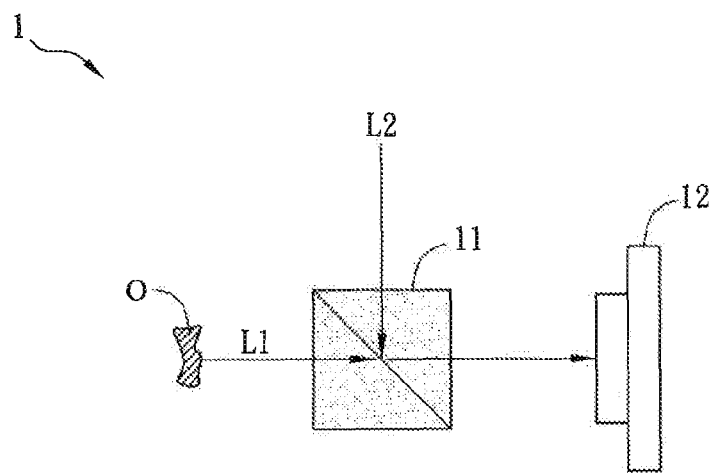
FIG. 1 is a schematic diagram of a conventional digital holographic apparatus.
Figure 2:
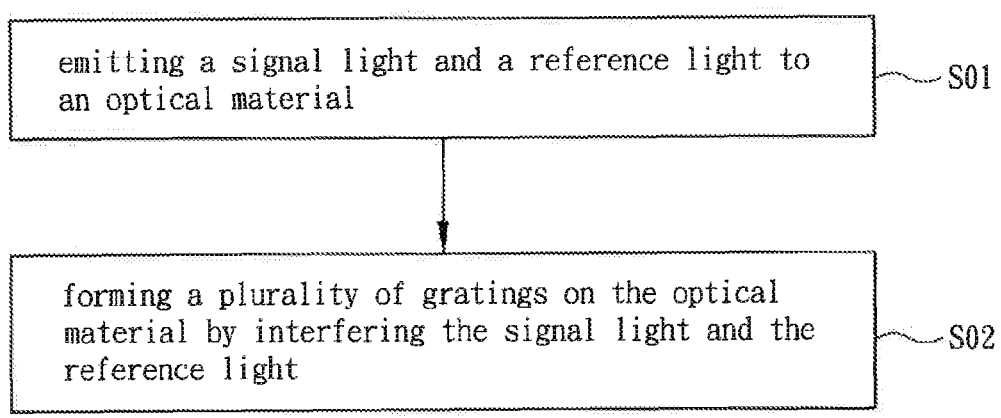
FIG. 2 is a flow chart of a manufacturing method of an optical element of a miniature microscope according to a preferred embodiment of the invention.
Figure 3A:
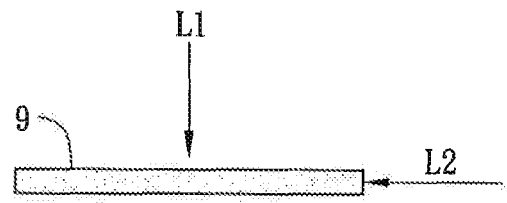
FIGS. 3A to 3I are schematic diagram showing various manufacturing methods of the optical element according to the preferred embodiment of the invention.

FIG. 2 is a flow chart of a manufacturing method of an optical element of a miniature microscope according to a preferred embodiment of the invention, and FIG. 3A is a schematic diagram showing the manufacturing method of the optical element of the embodiment. As shown in FIGS. 2 and 3A, the manufacturing method of the optical element of the miniature microscope includes the steps S01 and S02. The step S01 is to emit a signal light L1 and a reference light L2 to an optical material 9. The step S02 is to form a plurality of optical gratings on the optical material 9 by the signal light L1 and the reference light L2 interfering with each other. To be noted, since the gratings on the optical material 9 is a kind of microstructure, they are omitted in the following figures.

The optical material 9 can be, for example, a sensitive material, a photopolymer, or any high polymer that can be solidified from a molten state to record the interference fringes. Both of the signal light L1 and the reference light L2 can have any kind of wavefront, such as a plane wave or a spherical wave, which can be a converging spherical wave or a diverging spherical wave. The signal light L1 and the reference light L2 can have various wavefronts according to various requirements. The signal light L1 and the reference light L2 can have the same or different wavefront generated by the same light source. The signal light L1 is preferably a diverging spherical wave.

Accordingly, the signal light L1 and the reference light L2 interfere with each other on the optical material 9 to form the interference fringes, which are recorded by the optical material 9 to form the gratings. To be noted, the amplitude transmittance or refractive index's variance is correlated with the light absorption gross energy. Besides, if the optical material 9 includes a photopolymer, the manufacturing method further includes a step to expose and develop the optical material 9. After the exposure, the optical material 9 will become the optical element. Thereby, the optical element of the embodiment n have a width smaller than the width of the conventional beam splitter.

Figure 3B:
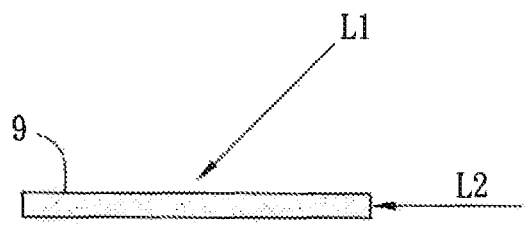
Figure 3C:
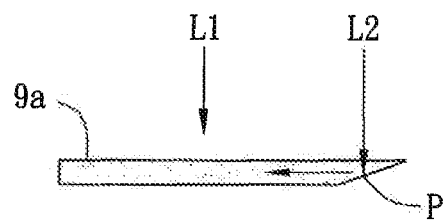
Figure 3D:
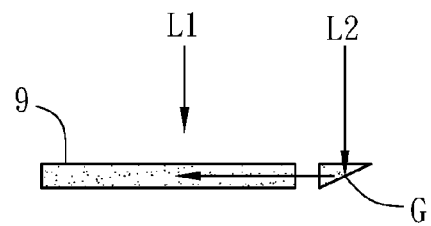
Figure 3E:
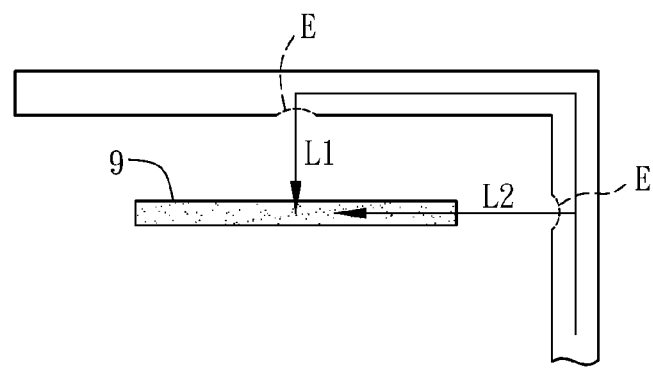
Figure 3F:
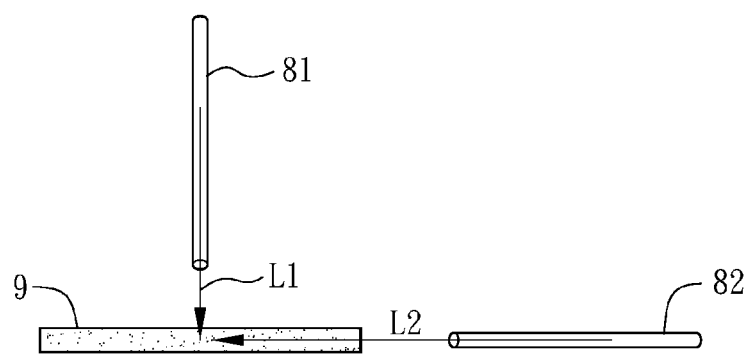
Figure 3G:
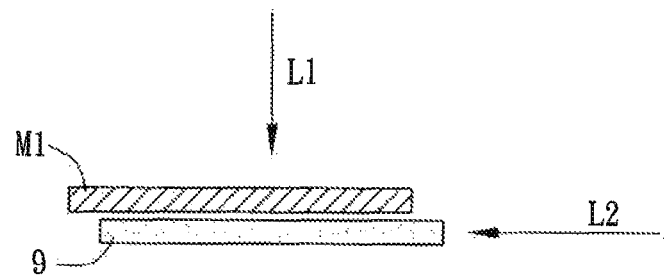
Figure 3H:
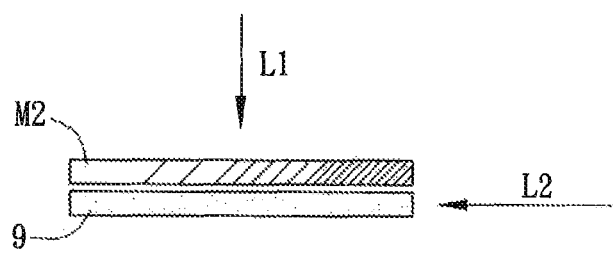
Figure 3I:
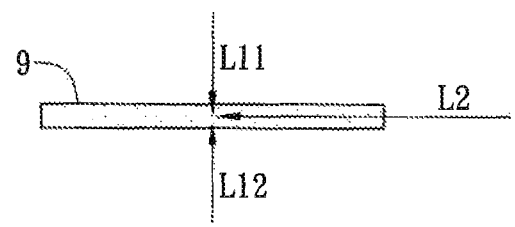

FIGS. 3A to 3I are schematic diagrams showing different ways that the signal light L1 and the reference light L2 are emitted to the optical materials 9 and 9a. Referring to FIGS. 3A and 3I, the different manufacturing methods of the optical element of the invention are illustrated as below.

As shown in FIGS. 3A to 3D, according to various applications and requirements, the signal light L1 and the reference light L2 can have an included angle between 0 degree and 180 degrees, or be parallel to each other. As shown in FIG. 3A, the included angle between the signal light L1 and the reference light L2 is 90 degrees. As shown in FIG. 3B, the included angle between the signal light L1 and the reference light L2 is smaller than 90 degrees. As shown in FIG. 3C, the optical material 9a has a lead angle P, and the reference light L2 is refracted by the lead angle P and interferes with the signal light L1 to form the gratings. As shown in FIG. 3D, the reference light L2 is refracted or reflected by a light-guiding element G and then emitted to the optical material 9. The light-guiding element G can be a prism, a light-guiding guiding plate, or a reflecting mirror for example. To be noted, in FIGS. 3C and 3D, the refraction angle of the reference light L2 is variable with different requirements.

As shown in FIG. 3E, the signal light L1 and the reference light L2 can be guided to the optical material 9 through a light pipe (or a light tube) that includes a bending portion (with a bending angle of 90 degrees for example) and two emitting portions E. Hence, the signal light L1 and the reference light L2 can be respectively emitted to the light material 9 in different angles through the emitting portions E. The emitting portions E can have microstructures to increase the light-emitting amount. As shown in FIG. 3F, the signal light L1 and the reference light L2 can be emitted to the optical material 9 in different angles through two optical fibers 81 and 82 disposed in different angles. To be noted, the light-guiding elements such as the light pipe and optical fiber are just instanced and not for limiting the scope of the invention. Besides, the incident angle of the reference light L2 is variable with different requirements.

When the reference light L2 travels more in the optical material 9, the light intensity is getting weaker. In other words, the diffraction intensity is weaker at the place which is farther from the incident surface of the reference light L2. Accordingly, as shown in FIG. 3G, the manufacturing method of the embodiment can further include a step of moving a mask M1 to adjust the light intensity of the signal light L1 emitted to the optical material 9. Corresponding to the quantity of the travelling distance of the reference light L2 in the optical material 9, the mask M1 is moved to control an illumination time of the signal light L1 to the optical material 9, so that the amplitude transmittance distribution of the optical material 9 after the exposure can be controlled to become an uniform diffraction distribution. In other words, the illumination time of the signal light L1 is increased more at the place which is farther from the incident surface of the reference light L2. As shown in FIG. 3H, besides using the movable mask, a gradually changeable light-decreasing plate M2 can be used to adjust the light intensity of the signal light L1 to the optical. material 9. For example, a portion of the gradually changeable light-decreasing plate M2 closer to the incident surface of the reference light L2 has less transmittance, and a portion of the gradually changeable light-decreasing plate M2 farther from. the incident surface of the reference light L2 has more transmittance.

As shown in FIG. 3I, according to different applications and requirements of the optical element, the signal light can be divided into a front signal light L11 and a rear signal light L12. Accordingly, the front signal light L11, the rear signal light L12, and the reference light L2 can form the interference fringes on the optical material 9, which are recorded by the optical material 9 to form the gratings. To be noted, it needs to he avoided that the front signal light L11, the rear signal light L12, and the reference light L2 interfere with one another simultaneously, so that the front signal light L11 and the rear signal light L12 can not form the gratings impairing the production of the images.

Accordingly, the optical element of the invention can be manufactured by different manufacturing methods corresponding to different applications and requirements. The signal light L1 is preferably a diverging spherical wave, and the object to be observed can be disposed near the light source of the diverging spherical wave, so that the more superior images of the object can be obtained.

Figure 4:
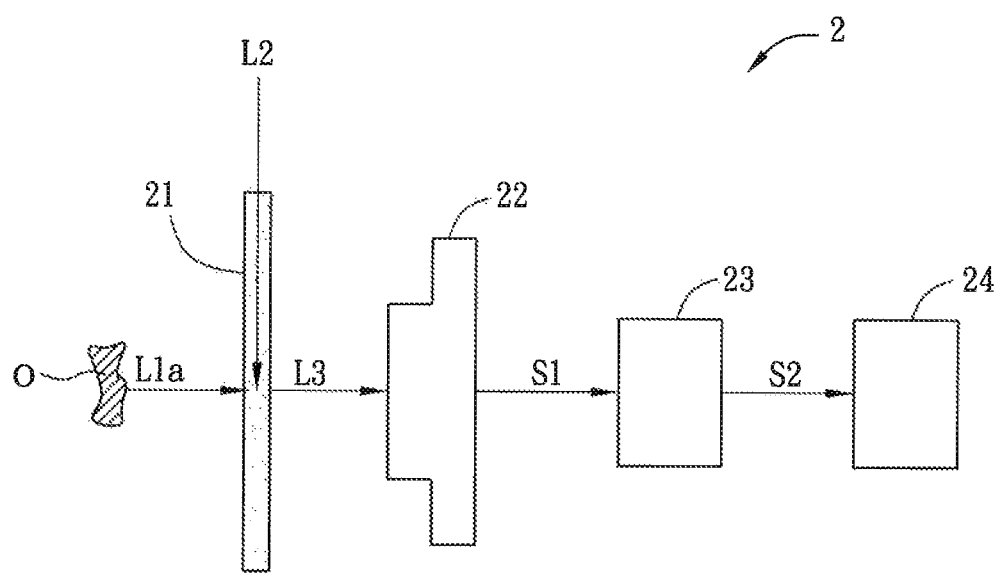
FIG. 4 is a schematic diagram of a miniature microscope according to a preferred embodiment of the invention.

FIG. 4 is a schematic diagram of a miniature microscope 2 according to a preferred embodiment of the invention. As shown in FIG. 4, the miniature microscope 2 includes a first optical element 21, an image-capturing element 22, a calculating element 23, and a display element 24.

The first optical element 21 can be made of the optical material 9 or 9a by the manufacturing methods as mentioned in the above embodiments. Because the features of the optical element are illustrated as above, the detailed descriptions are omitted here. An object light L1a and a reference light L2 penetrate the first optical. element 21. The reference light L2 is diffracted by the first optical element 21 so that the reference light is changed in its travelling direction to form a light field interference distribution L3 with the object light L1a. In the embodiment, the object light L1a can be the light that is reflected or scattered by the object O, or directly penetrates the object O.

The image-capturing element 22 can be, for example, a charge-coupled

Device (CCD) or other kind of light-sensing element. The image-capturing element 22 receives the light field interference distribution L3 to generate an image signal S1. The calculating element 23 is any kind of computer or computer cluster. The calculating element 23 calculates according to the image signal S1 to produce a display signal S2. In other words, the calculating element 23 calculates according to the image signal S1 obtained by the image-capturing element 22 to produce the display signal S2. The display element 24 can be, for example, a cathode ray tube (CRT) display, a liquid crystal display (LCD), or other kind of display. The display element 24 receives the display signal S2 to display an image of the object.

Accordingly, because the conventional beam splitter is replaced by the first optical element 21, which is thinner than the conventional beam splitter, of the invention, the distance between the object O and the image-capturing element 22 can be reduced, so that the image-capturing element 22 can receive the high-frequency portion of the signal light L1 so as to enhance the definition of the reconstructed image of the object. Because the definition of the reconstructed object image is enhanced, the clear image of the object O can be obtained. Besides, because the first optical element 21 is thinner and the distance between the object O and the image-capturing element 22 is reduced, the microscope's size can be reduced to become the miniature microscope 2.

FIGS. 5A to 5D are schematic diagrams of different aspects of the miniature microscope of the embodiment.

Figure 5A:
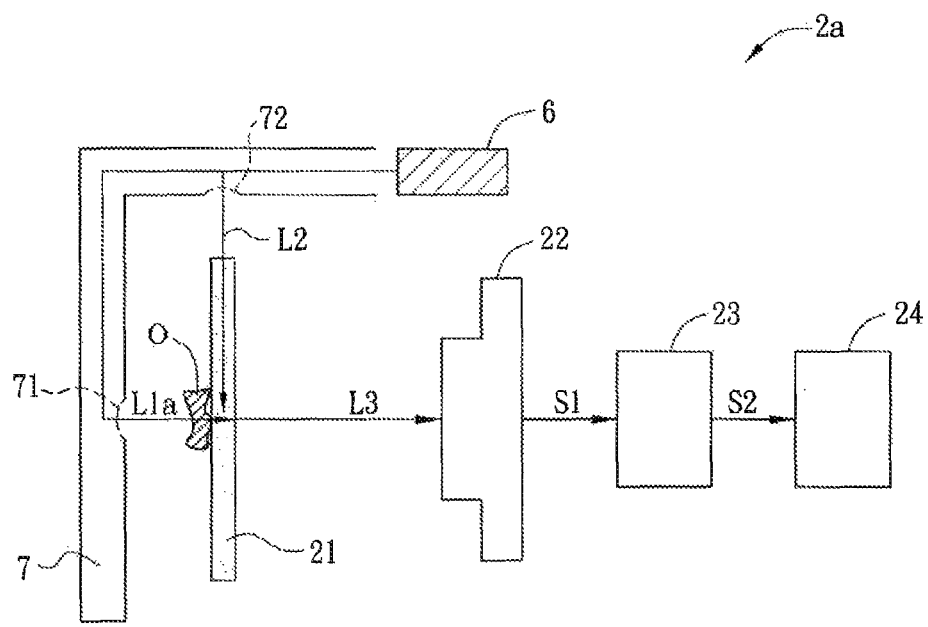
FIGS. 5A to 5D are schematic diagrams of different aspects of the miniature microscope according to the preferred embodiment of the invention.

As shown in FIG. 5A, the miniature microscope 2a can further include a light source 6 and a light-guiding element. The light source 6 can be a laser source for example to generate a coherent light. In the embodiment, the light-guiding element is, for example, a hollow or solid light pipe (or light tube) 7, and is instanced as a hollow light pipe here. The light pipe 7 includes two small openings 71 and 72. The light is emitted from the opening 71 to the object O disposed near the opening 71 to generate an object light L1a. The light emitted from the opening 72 is used as a reference light L2 and emitted to the first optical element 21.

Figure 5B:
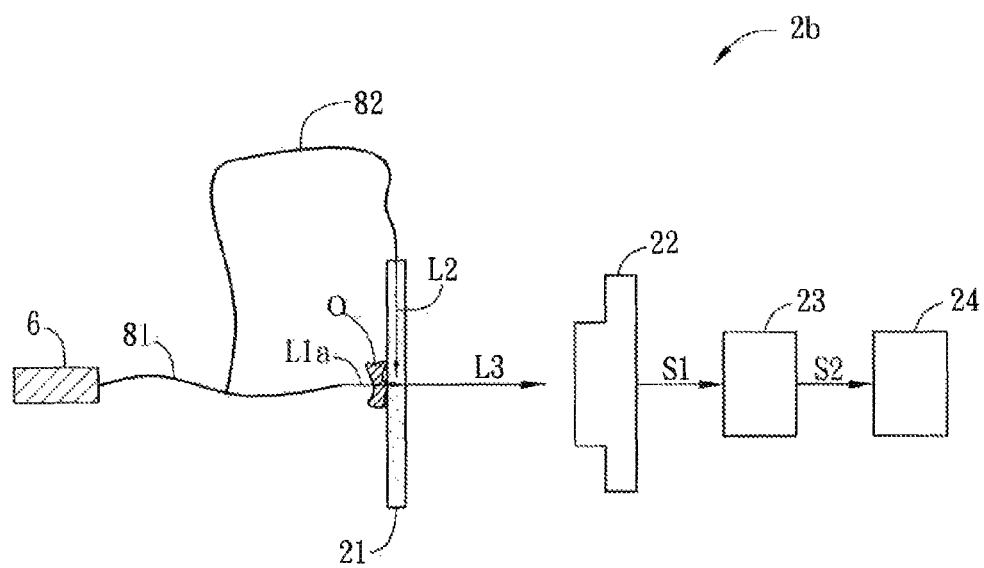

As shown in FIG. 5B, the miniature microscope 2b includes the light-guiding element, such as optical fibers 81 and 82. The optical fibers 81 and 82 can be rolled up to decrease the space for configuration. To be noted, the light pipe and the optical fiber are just for example.

Figure 5C:
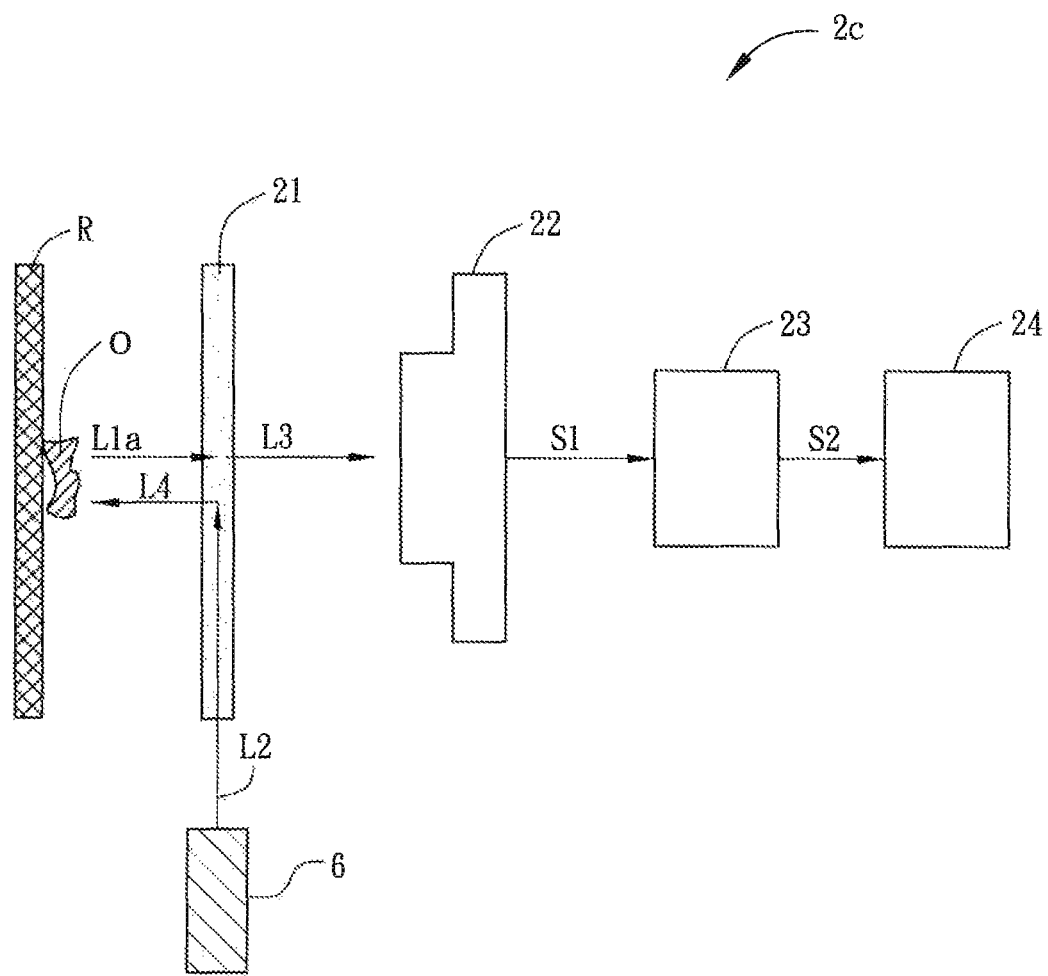
Figure 5D:
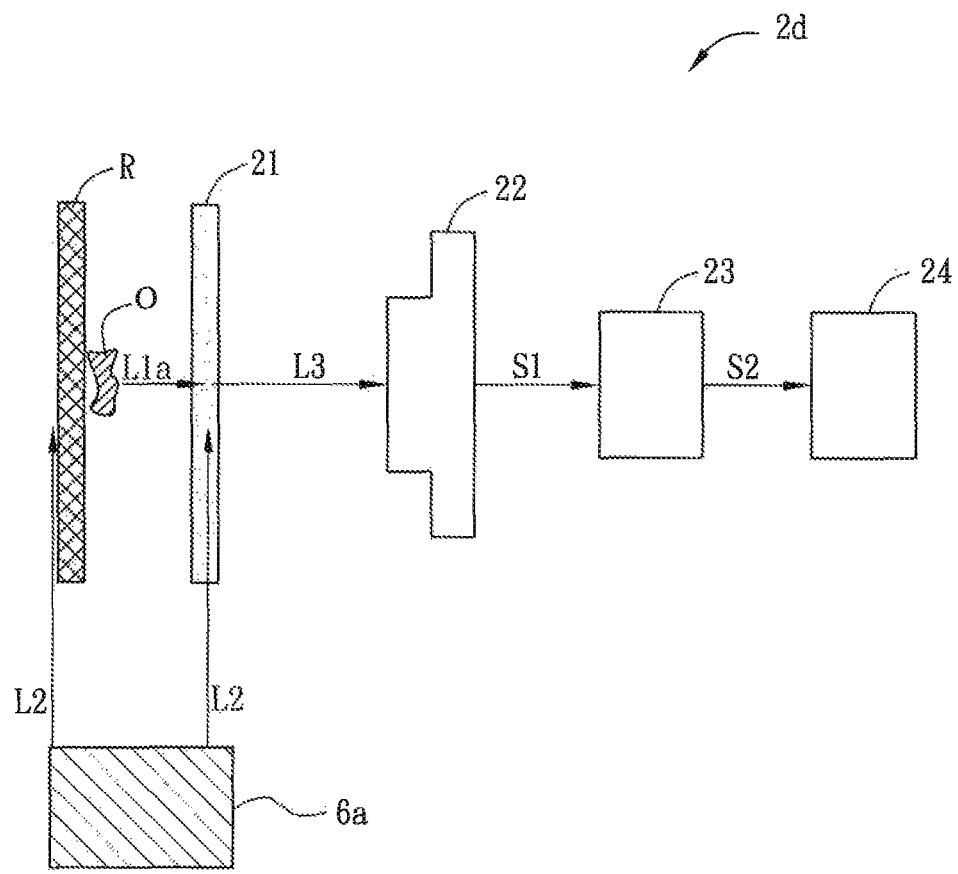

As shown in FIG. 5C, the miniature microscope 2c includes a light source 6 and a reflecting element R on which the object O is disposed. The light emitted by the light source 6 is diffracted by the first optical element 21 to become a diffracted light L4 emitted to the object O. The diffracted light L4 is scattered and reflected by the object O to become an object light L1a. The object light L1a is emitted to the first optical element 21 and interferes with the reference light L2, so that a light field interference distribution L3 is formed and captured by the image-capturing element 22. In the embodiment, the reflecting element R can he a reflecting mirror. By using the reflecting element R, the utilization rate of the light emitted by the light source 6 can be enhanced. As shown in FIG. 5D, the light source 6a of the miniature microscope 2d provides the object light L1a emitted to the object O, and also provides the reference light L2.

Figure 6A:
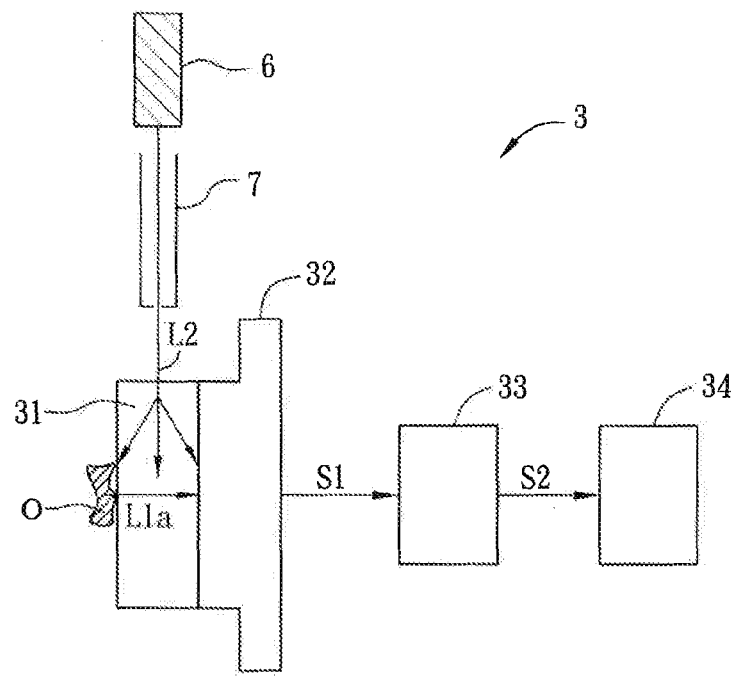
FIGS. 6A and 6B are schematic diagrams of the miniature microscopes according to another preferred embodiment of the invention.
Figure 6B:
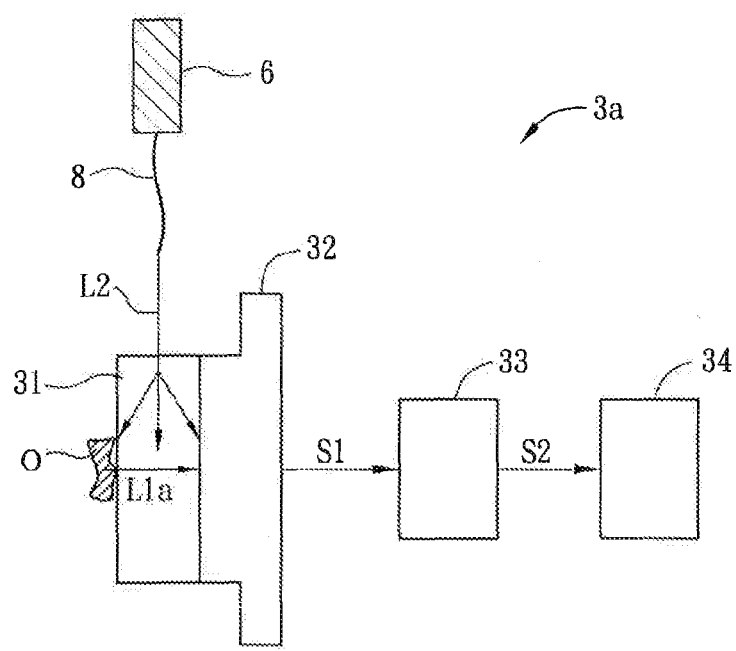

FIGS. 6A and 6B are schematic diagrams of the miniature microscopes 3 and 3a according another preferred embodiment of the invention. In the embodiment, the first optical element 21 of the above embodiments is replaced with a glass sheet or a high polymer (e.g. PMMA) to become a first optical element 31, which is disposed in front of the image-capturing element 32. In the embodiment, the first optical element 31 is disposed on a side of the image-capturing element 32 far from the display element 34. Besides, the object O is disposed on the first optical element 31.

The coherent light provided by the light source 6 is emitted to the first optical element 31 through the little opening of the light pipe 7 (as shown in FIG. 6A) or through the optical fiber 8 (as shown in FIG. 6B). The object O to be observed is disposed on the first optical element 31. Because the opening of the light pipe 7 or the optical fiber 8 is very small, the wavefront of the light is approximate to a spherical wave. Accordingly, the wavefront of the light in the first optical element. 31 is a diverging spherical wave. A portion of the diverging spherical wave is directly emitted to the image-capturing element 32, used as the reference light L2. Another portion of the diverging spherical wave is emitted to the object O and then scattered and reflected by the object O to become a scattered light and a reflected light that are used as the object light L1a. Likewise, the object light L1a and the reference light L2 interfere with each other to generate a light field interference distribution, the image-capturing element 32 receives the light field interference distribution to generate the image signal S1, the calculating element 33 calculates according to the image signal S1 to produce the display signal S2, and the display element 34 receives the display signal S2 to display the object's image.

Figure 6C:
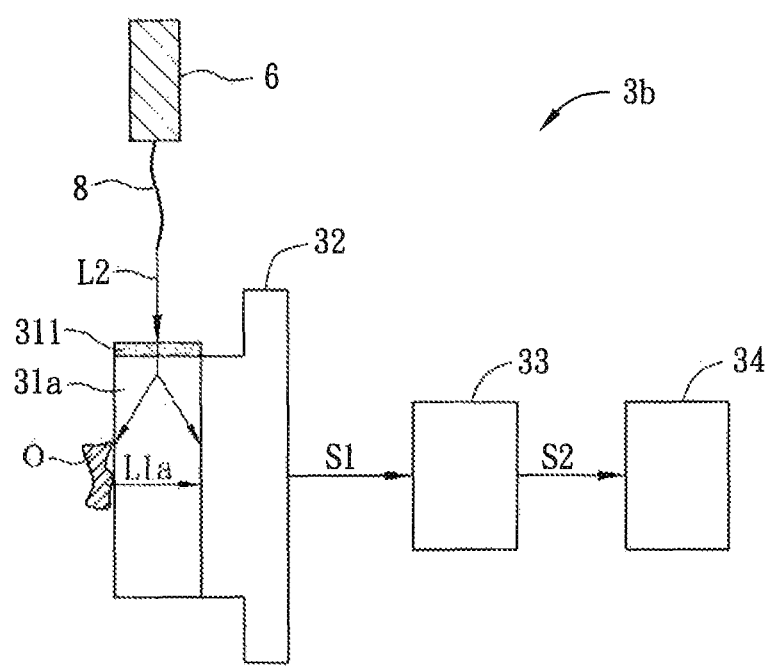
FIG. 6C is a schematic diagram of another aspect of the miniature microscope according to the another preferred embodiment of the invention.

FIG. 6C is a schematic diagram of a miniature microscope 3b as another aspect of the embodiment. As shown in FIG. 6C, a microstructure 311 is disposed at a side of the first optical element 31a, and a coherent light is emitted through the microstructure 311. After emitted through the microstructure 311, the light's wavefront becomes a spherical wave or a plane wave. Afterwards, the incident light is mainly divided into two beams, one of which is emitted to the image-capturing element 32 and used as the reference light L2. The other beam is emitted to the object O to be observed disposed on the first optical element 31a, and then scattered and reflected by the object O to become the object light L1a.

Figure 7A:
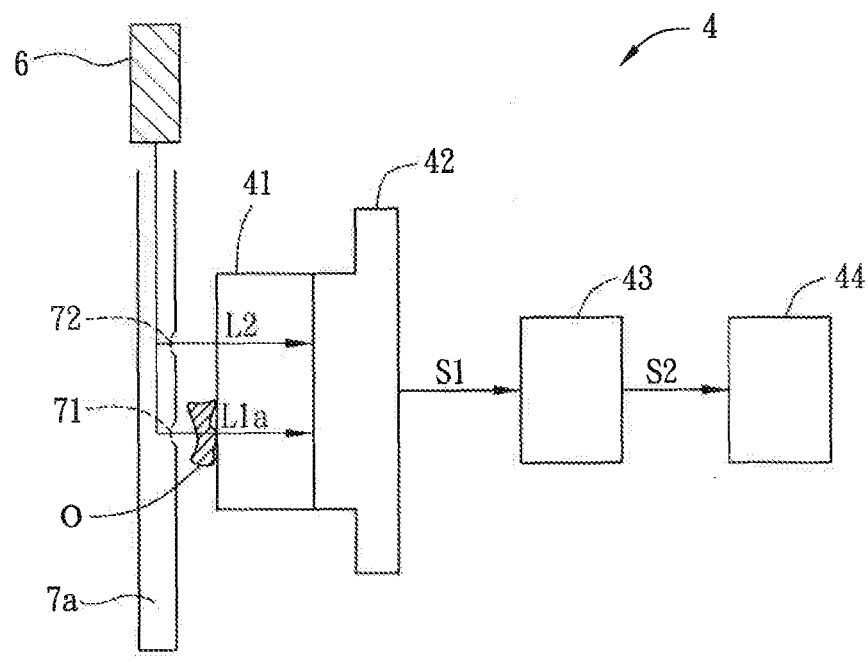
FIG. 7A is a schematic diagram of a miniature microscope according to another preferred embodiment of the invention.

FIG. 7A is a schematic diagram of a miniature microscope 4 according to another preferred embodiment of the invention. The main difference between the miniature microscope 4 and the embodiments as shown in FIG. 6A is that the object light L1a and the reference light L2 of the miniature microscope 4 are emitted to the image-capturing element 42 in parallel. The light provided by the light source 6 can be emitted, directly or through a light-guiding element, to the first optical element 41. The light-guiding element can be a light pipe 7a or an optical fiber, and here is instanced as a light pipe 7a. The light pipe 7a has two openings 71 and 72 at the same side thereof. When the coherent light provided by the light source 6 is emitted through the openings 71 and 72 of the light pipe 7a, the light's wavefront is approximate to a diverging spherical wave because the openings 71 and 72 are very small. The light through the opening 72 is used as the reference light L2. The object O is disposed near another opening 71. The light through the opening 71 is emitted to the object O, and then scattered by or directly passed through the object O, used as the object light L1a. The reference light L2 and the object light L1a interfere with each other to form the interference fringes, which are captured and recorded by the image-capturing element 42 to generate the image signal S1. The image-capturing element 42 can be disposed as possible as close to the object O. The calculating element 43 receives the image signal S1 and calculates according to the image signal S1 to produce the display signal S2. The display element 44 receives the display signal S2 to display the object's images.

Figure 7B:
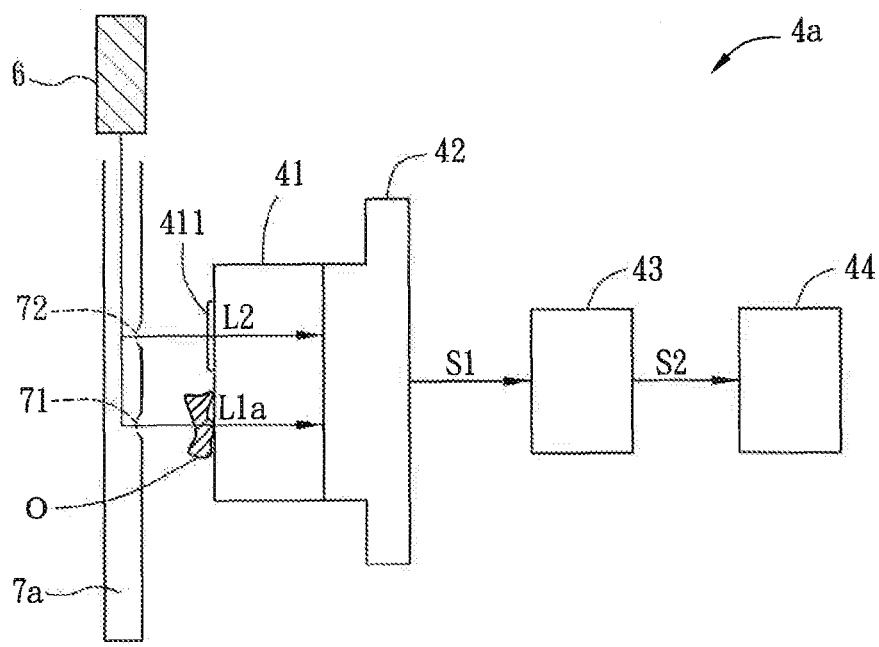
FIGS. 7B and 7C are schematic diagrams of miniature microscopes as various aspects of the another preferred embodiment of the invention.
Figure 7C:
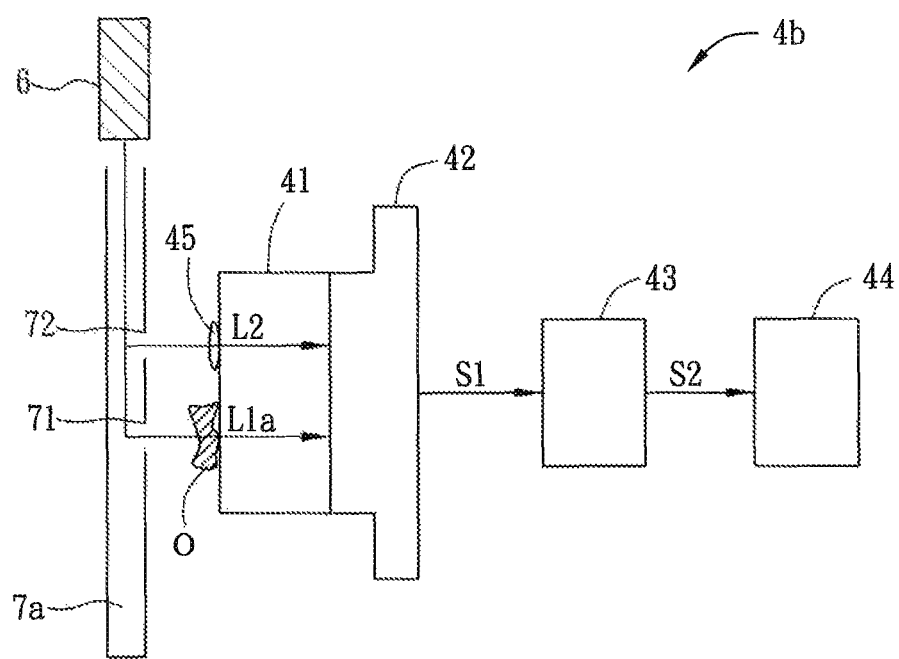

FIGS. 7B and 7C are schematic diagrams of miniature microscopes 4a and 4b as various aspects of the embodiment of the invention. The main difference between the miniature microscopes 4a and 4b and the above embodiments is that the first optical element 41 has a microstructure 411 (as shown in FIG. 7B) disposed at an incident place through which the reference light L2 is emitted to the first optical element 41, or the miniature microscope 4h further includes an optical element 45 (such as a lens as shown in FIG. 7C). Accordingly, the reference light L2 is emitted through the microstructure 411 (as shown in FIG. 7B) or the optical element 45 (as shown in FIG. 7C), and then emitted to the first optical element 41. A spherical wave can be converted into a plane wave by the microstructure 411 (as shown in FIG. 7B) or the optical element 45 (as shown in FIG. 7C), so that the wavefront of the reference light L2 emitted to the image-capturing element 42 is a plane wave.

Figure 8A:
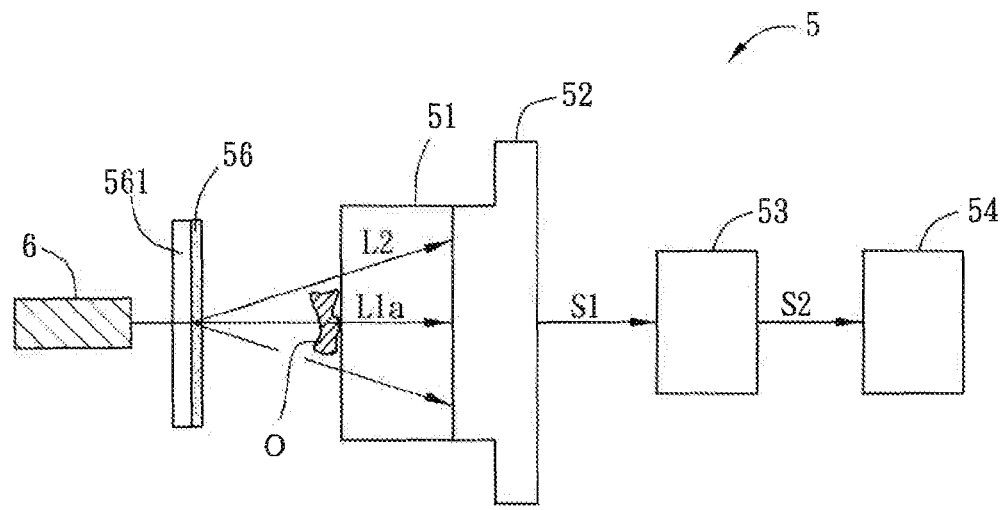
FIG. 8A is a schematic diagram of a miniature microscope according to another preferred embodiment of the invention.

FIG. 8A is a schematic diagram of a miniature microscope 5 according to another preferred embodiment of the invention. The main difference between the miniature microscope 5 and the embodiment as shown in FIG. 6A is that the miniature microscope 5 further includes a second optical element 56, the object O is disposed between the first optical element 51 and the second optical element 56, and the light provided by the light source 6 is emitted to the second optical element 56 through a side of the second optical element 56 far from the object O. The first optical element 51 is a glass sheet or a high polymer. The second optical element 56 can be made by the manufacturing method as shown in FIG. 2. The second optical element 56 can be attached to a glass plate 561 or other modules. The second optical element 56 can be attached to a top side or a bottom side of the glass plate 561, or the second optical element 56 can be clipped by two glass plates 561, or two second optical elements 56 clip a glass plate 561. In the embodiment, the second optical element 56 is attached to the bottom side of the glass plate 561 for example.

The second optical element 56 is attached to the glass plate 561, and capable of converting the light emitted by the light source 6 into a diverging spherical wave for expanding the light beam. The light directly emitted to the image-capturing element 52 without through the object O is used as the reference light L2. The light emitted to the object O and then scattered by or passed through the object O is used as the object light L1a. The reference light L2 and the object light L1a interfere with each other to form a light field interference distribution, which is received by the image-capturing element 52 to generate the image signal S1. The calculating element 53 receives the image signal S1 and calculates according to the image signal S1 to produce the display signal S2. The display element 54 receives the display signal S2 to display the object's images.

Figure 8B:
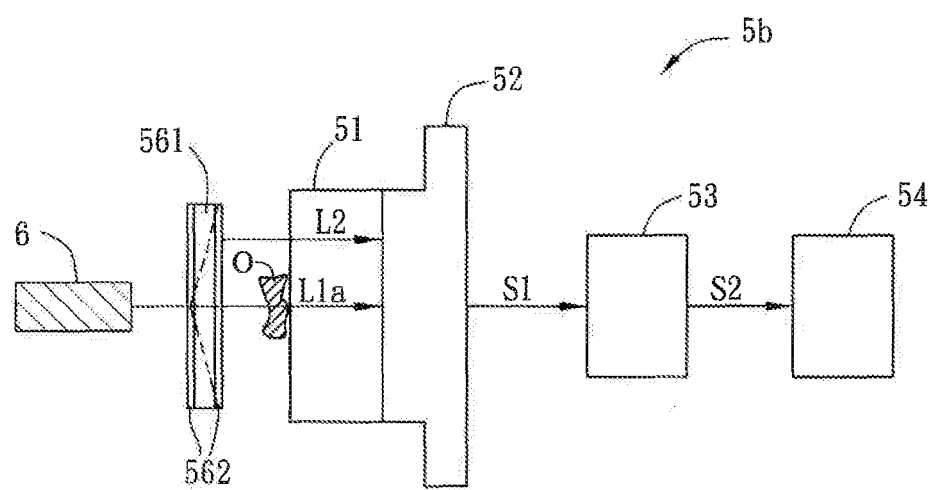
FIG. 8B is a schematic diagram of a miniature microscope as another aspect of the another preferred embodiment of the invention.

FIG. 8B is a schematic diagram of a miniature microscope 5b as another aspect of the embodiment. The main difference between the miniature microscope 5b and the miniature microscope 5 is that the second optical element of the miniature microscope 5b is a glass plate 561, and two surfaces of the glass plate 561 both have a microstructure 562. The two microstructures 562 can be disposed at the top and bottom sides of the glass plate 561 respectively, or the microstructures 562 can be disposed at the same side of the glass plate 561, e.g. one of the top and bottom sides. In the embodiment, the microstructures 562 are disposed at the top and bottom sides of the glass plate 561 respectively for example.

The light provided by the light source 6 and emitted to the glass plate 561 is converted into a diverging spherical wave by the microstructure 562 disposed at the top side, and then converted into a plane wave by the microstructure 562 disposed at the bottom side. Afterwards, a portion of the light directly emitted to the image-capturing element 52 without through the object O is used as the reference light L2. Another portion of the light emitted to the object O and then scattered by or passed through the object O is used as the object light L1a. The reference light L2 and the object light L1a interfere with each other to form a light field interference distribution, which is received by the image-capturing element 52 to generate the image signal S1. The calculating element 53 receives the image signal S1 and calculates according to the image signal S1 to produce the display signal S2. The display element 54 receives the display signal S2 to display the object's images.

In summary, in the manufacturing method of the optical element of the invention, an optical material is used to form the thinner optical element, so that the distance between the object and the image-capturing element can be reduced. Hence, the image-capturing element can receive the high-frequency portion of the signal light so as to enhance the definition of the reconstructed object's images. Furthermore, because the definition of the reconstructed object's images is enhanced, the clearer images can be obtained. Besides, by the thinner optical element, the apparatus's size can be reduced. Accordingly, the optical element of the invention can be used to manufacture a miniature microscope.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A manufacturing method of a first optical element applied to a miniature microscope, comprising the steps of:
    emitting a signal light and a first reference light to an optical material;
    forming a plurality of gratings on the optical material by interfering the signal light and the first reference light; and
    emitting an object light and a second reference light through the first optical element to form a light field interference distribution;
    wherein an image-capturing element receives the light field interference distribution to generate an image signal;
    wherein a calculating element receives the image signal and calculates according to the image signal to produce a display signal; and
    wherein a display element receives the display signal to display an image of an object.

2. The manufacturing method as recited in claim 1, further comprising:
    exposing and developing the optical material.

3. The manufacturing method as recited in claim 1, wherein each of the signal light and the first reference light is a plane wave or a spherical wave.

4. The manufacturing method as recited in claim 1, wherein the first reference light and the signal light have an included angle.

5. The manufacturing method as recited in claim 1, wherein the optical material has a lead angle.

6. The manufacturing method as recited in claim 1, wherein the first reference light is emitted to the optical material through a light-guiding element.

7. The manufacturing method as recited in claim 1, further comprising:
    moving a mask to adjust the light intensity of the signal light emitted to the optical material.

8. The manufacturing method as recited in claim 1, further comprising:
    adjusting the light intensity of the signal light emitted to the optical material by using a gradually changeable light-decreasing plate.

9. The manufacturing method as recited in claim 1, wherein the signal light is divided into a front signal light and a rear signal light.

10. The manufacturing method as recited in claim 1, wherein the first optical element includes a microstructure through which the second reference light is emitted.

11. The manufacturing method as recited in claim 1, wherein a second optical element is provided, the second reference light being emitted to the first optical element after emitted through the second optical element.

12. The manufacturing method as recited in claim 1, wherein a light source generates a coherent light emitted to the object to form the object light.

13. The manufacturing method as recited in claim 1, wherein the light source generates the second reference light.

14. The manufacturing method as recited in claim 1, wherein a second optical element is provided, the object being disposed between the first and second optical elements.

15. The manufacturing method as recited in claim 1, wherein a light-guiding element through which the coherent light passes is provided.

16. The manufacturing method as recited in claim 1, wherein the object is disposed on a reflecting element.

17. The manufacturing method as recited in claim 1, wherein the second reference light and the signal light have an included angle.

18. The manufacturing method as recited in claim 1, wherein the first optical element has a lead angle.

* * * * *